United States Patent
Jung et al.

(10) Patent No.: US 12,365,228 B2
(45) Date of Patent: Jul. 22, 2025

(54) ELECTRIC VEHICLE STRUCTURE

(71) Applicants: HYUNDAI MOTOR COMPANY, Seoul (KR); KIA CORPORATION, Seoul (KR)

(72) Inventors: Dae Woo Jung, Seongnam-si (KR); Jung Taek Lim, Seoul (KR); Sung Eun Ryu, Seoul (KR); Byong Cheol Kim, Seoul (KR); Hyeong Seung Ham, Anyang-si (KR); Dong Hwan Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 557 days.

(21) Appl. No.: 17/860,762

(22) Filed: Jul. 8, 2022

(65) Prior Publication Data
US 2023/0055401 A1 Feb. 23, 2023

(30) Foreign Application Priority Data
Aug. 17, 2021 (KR) .......... 10-2021-0108310

(51) Int. Cl.
*B60K 1/00* (2006.01)
(52) U.S. Cl.
CPC ..................... *B60K 1/00* (2013.01)
(58) Field of Classification Search
CPC ..................................... B60K 1/00
See application file for complete search history.

(56) References Cited

U.S. PATENT DOCUMENTS

| | | | | |
|---|---|---|---|---|
| 5,740,876 A * | 4/1998 | Shimose | ............... | B60K 5/1216 180/300 |
| 6,994,178 B2 * | 2/2006 | Mizuno | ............... | B60K 1/04 180/312 |
| 7,588,117 B2 * | 9/2009 | Fukuda | ............... | B62D 21/155 180/291 |
| 7,886,861 B2 * | 2/2011 | Nozaki | ............... | B60K 1/00 280/783 |
| 8,511,416 B2 * | 8/2013 | Hiruma | ............... | B60K 1/00 180/291 |
| 8,517,140 B2 * | 8/2013 | West | ............... | B60G 3/20 280/124.135 |
| 8,651,216 B2 * | 2/2014 | Wakatsuki | ............... | B60K 1/00 180/291 |
| 8,657,365 B2 * | 2/2014 | Amano | ............... | B62D 21/152 296/187.11 |
| 8,720,636 B2 * | 5/2014 | Akoum | ............... | H01M 50/249 180/68.5 |

(Continued)

FOREIGN PATENT DOCUMENTS

WO WO-2018131552 A1 * 7/2018 ............... B60K 1/00

*Primary Examiner* — Jacob B Meyer
(74) *Attorney, Agent, or Firm* — Lempia Summerfield Katz LLC

(57) ABSTRACT

An electric vehicle structure includes a drive system, a front lateral member and a rear upper lateral member. The front and rear lateral members are elongated in a lateral direction of a vehicle and spaced apart from each other in a forward-rearward direction of the vehicle with the drive system interposed therebetween. The vehicle structure further includes a rear lower lateral member elongated in the lateral direction of the vehicle and disposed beneath a motor of the drive system.

17 Claims, 4 Drawing Sheets

(56) References Cited

U.S. PATENT DOCUMENTS

| | | | | |
|---|---|---|---|---|
| 8,991,530 | B2* | 3/2015 | Langer | H01M 50/249 |
| | | | | 180/312 |
| 9,174,520 | B2* | 11/2015 | Katayama | B60K 1/00 |
| 9,371,009 | B2* | 6/2016 | Ishikawa | H01M 8/2457 |
| 9,387,751 | B2* | 7/2016 | Kashiwai | B60K 1/00 |
| 9,573,452 | B2* | 2/2017 | Agnew | B60K 1/00 |
| 9,649,923 | B2* | 5/2017 | Perlo | B60K 1/04 |
| 9,711,819 | B2* | 7/2017 | Ishikawa | B60L 50/71 |
| 10,029,551 | B2* | 7/2018 | Ito | H01M 10/6551 |
| 10,518,627 | B2* | 12/2019 | Nagpal | B62D 21/11 |
| 10,696,149 | B2* | 6/2020 | Pearce, Jr. | B60H 1/00392 |
| 11,214,136 | B2* | 1/2022 | Brock | B60K 7/00 |
| 12,172,524 | B1* | 12/2024 | Tanimura | B60K 5/1208 |
| 2008/0078603 | A1* | 4/2008 | Taji | H02K 5/00 |
| | | | | 180/312 |
| 2008/0179116 | A1* | 7/2008 | Ikenoya | B60K 17/356 |
| | | | | 180/63 |
| 2013/0306394 | A1* | 11/2013 | Theodore | B60K 6/40 |
| | | | | 280/798 |
| 2023/0055401 | A1* | 2/2023 | Jung | B60K 1/00 |

\* cited by examiner

ELECTRIC VEHICLE STRUCTURE

CROSS-REFERENCE TO THE RELATED APPLICATION

This application claims priority to Korean Patent Application No. 10-2021-0108310, filed on Aug. 17, 2021, in the Korean Intellectual Property Office, the disclosure of which is incorporated herein by reference in its entirety.

BACKGROUND

1. Field of the Disclosure

The present disclosure relates to an electric vehicle structure, and more particularly, to an arrangement structure of a drive system.

2. Description of the Related Art

A drive system for an electric vehicle includes a motor, a reducer or transmission, an inverter, and the like. Such an electric vehicle drive system may be mounted at the rear of a vehicle to implement rear-wheel drive or four-wheel drive for the vehicle.

When the above drive system is mounted at the rear of the vehicle, it is necessary to secure or conserve as much interior space in the vehicle as possible. In addition, when a rear-wheel steering system is installed in the vehicle, it is necessary to prevent interference therewith, as well as to reliably support the rear wheels to ensure that the vehicle has excellent handling performance.

The foregoing is intended merely to enhance understanding of the background of the present disclosure. The foregoing is not intended to acknowledge that the present inventive concept or the foregoing falls within the purview of the related art that is already known to those of ordinary skill in the art.

SUMMARY

The present disclosure has been made in view of the above problems. It is an object of the present disclosure to provide an electric vehicle structure that includes a drive system installed to drive rear wheels of a vehicle independently of front wheels thereof to secure or conserve as much interior space in the vehicle as possible. In addition, the electric vehicle structure can be configured such that, when a rear-wheel steering system is installed in the vehicle, it is possible to prevent interference therewith and to reliably support the rear wheels to ensure that the vehicle has excellent handling performance.

In accordance with an aspect of the present inventive concept, the above and other objects can be accomplished by the provision of an electric vehicle structure. The electric vehicle structure includes: a drive system; a front lateral member and a rear upper lateral member, which are elongated in a lateral direction of a vehicle and spaced apart from each other in a forward-rearward direction of the vehicle with the drive system interposed therebetween; and a rear lower lateral member elongated in the lateral direction of the vehicle and disposed beneath a motor of the drive system.

The drive system may include the motor and a differential configured to receive power from the motor and output the power to both sides of the vehicle.

The motor may have a rotary shaft disposed parallel to and spaced apart from a rotary shaft of the differential.

The rotary shaft of the motor may be disposed above and behind the rotary shaft of the differential in the vehicle so that a straight line connecting the rotary shaft of the motor to the rotary shaft of the differential is inclined from upper rear side to lower front side in the vehicle.

The front lateral member may be located above the straight line and the rear upper lateral member may be located beneath the straight line.

The rear lower lateral member may be installed at a height such that areas of the rear lower lateral member and the front lateral member that are projected in the forward-rearward direction of the vehicle overlap each other by 70% or more.

The front lateral member and the rear lower lateral member may be disposed beneath the rotary shaft of the differential.

The rear upper lateral member may be disposed above the rotary shaft of the differential.

The rear lower lateral member may be disposed in front of the rear upper lateral member in the vehicle.

The drive system may include an inverter configured to control the motor.

The inverter may be installed in front of the motor and above the differential to form a single unit together with the motor and the differential.

The electric vehicle structure may further include a rear-wheel steering system disposed between the rear upper lateral member and the rear lower lateral member.

The rear-wheel steering system may be disposed beneath a rotary shaft of the motor.

The rear upper lateral member may be provided with a mount configured to support the drive system.

The rear lower lateral member may be connected to a lower arm configured to support a rear-wheel knuckle.

In accordance with another aspect of the present inventive concept, there is provided an electric vehicle structure. The electric vehicle structure includes: a drive system including a motor and a differential; a front lateral member elongated in a lateral direction of a vehicle in front of the drive system in the vehicle; and a rear upper lateral member and a rear lower lateral member, which are elongated in the lateral direction of the vehicle behind the drive system in the vehicle.

The drive system may be configured such that the motor has a rotary shaft parallel to a rotary shaft of the differential and the rotary shaft of the motor is located above and behind the rotary shaft of the differential in the vehicle.

Some of the front lateral member, the rear upper lateral member, and the rear lower lateral member may be located above a straight line connecting the rotary shaft of the motor to the rotary shaft of the differential. The rest of the front lateral member, the rear upper lateral member, and the rear lower lateral member may be located beneath the straight line.

The front lateral member may be located above the straight line connecting the rotary shaft of the motor to the rotary shaft of the differential.

The rear upper lateral member and the rear lower lateral member may be disposed beneath the straight line.

The rear upper lateral member and the rear lower lateral member may be disposed beneath the straight line connecting the rotary shaft of the motor to the rotary shaft of the differential.

The rear lower lateral member may be disposed in front of and beneath the rear upper lateral member in the vehicle.

The front lateral member and the rear lower lateral member may be disposed in front of and beneath and behind and beneath the rotary shaft of the differential, respectively, so as to form a triangle.

The electric vehicle structure may further include a rear-wheel steering system disposed between the rear lower lateral member and the rear upper lateral member.

The drive system may include an inverter configured to control the motor.

The inverter may be disposed above the straight line connecting the rotary shaft of the motor to the rotary shaft of the differential.

The inverter may be installed in front of the motor and above the differential to form a single unit together with the motor and the differential.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION OF THE EMBODIMENTS

Figure 1:
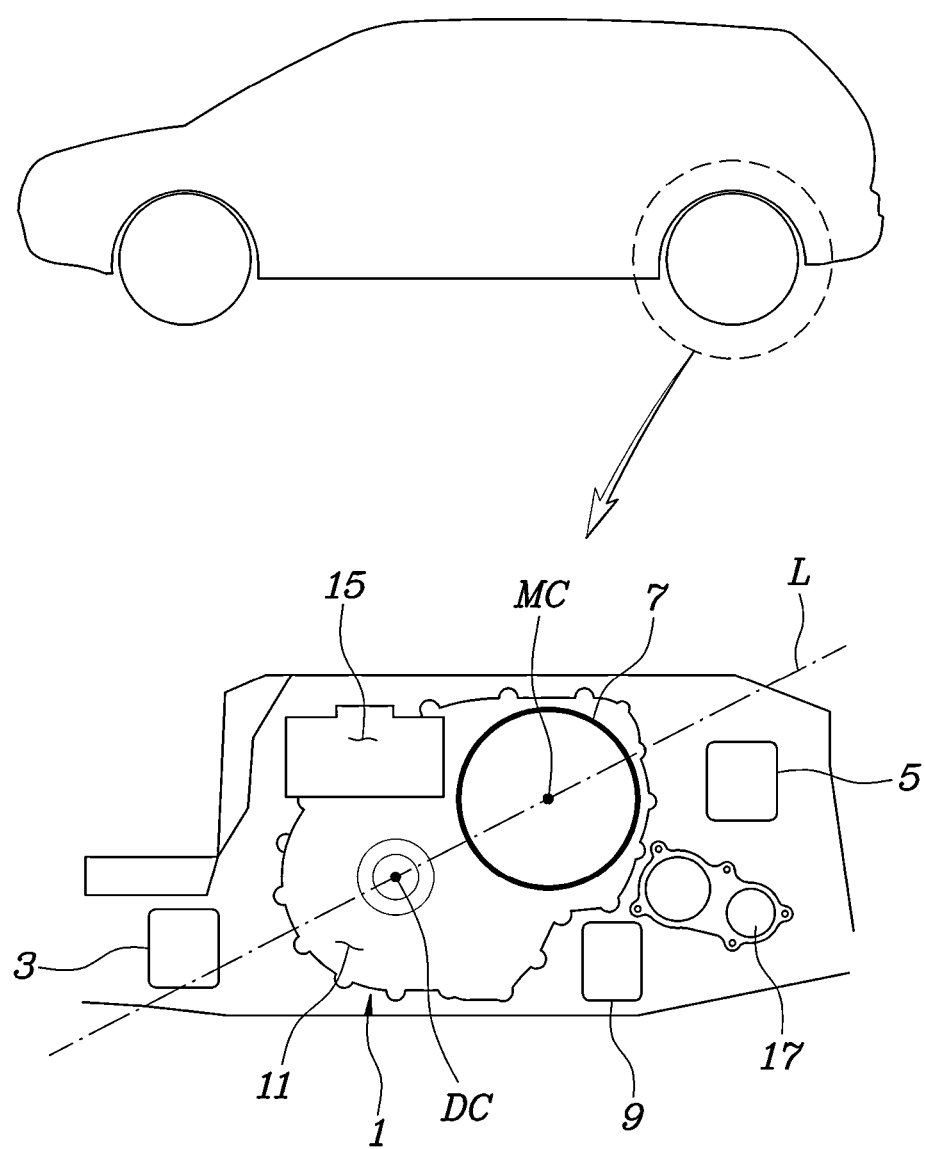
FIG. 1 is a view illustrating an electric vehicle structure according to an embodiment of the present disclosure.
Figure 2:
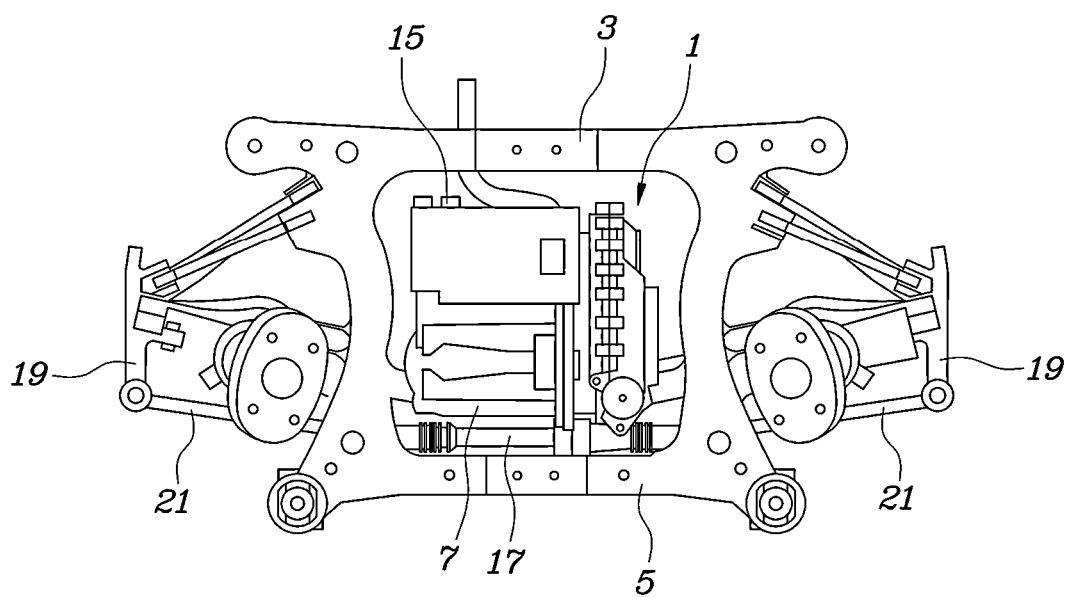
FIG. 2 is a top view of FIG. 1.
Figure 3:
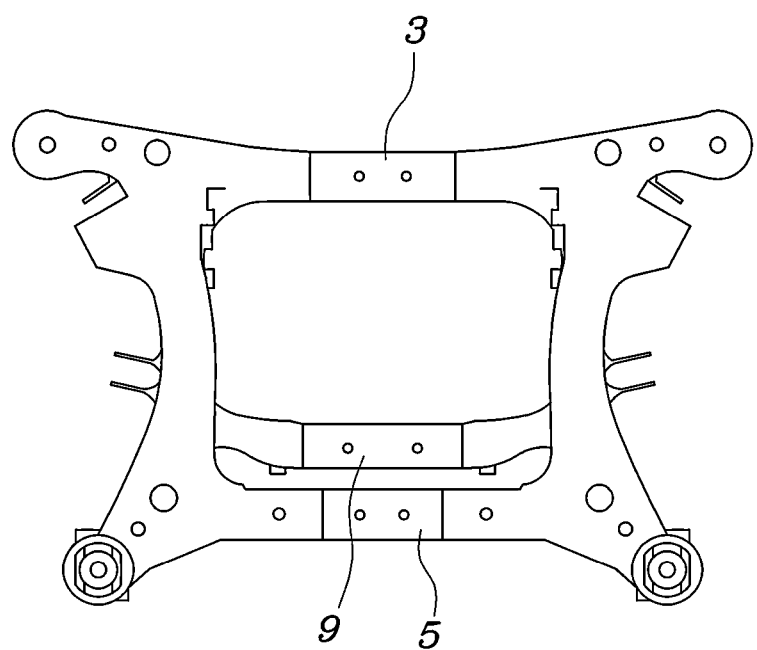
FIG. 3 is a view illustrating in detail the front lateral member, the rear upper lateral member, and the rear lower lateral member of FIG. 2.

The specific structural and functional descriptions disclosed in the specification or application are merely provided for the purpose of describing embodiments of the present inventive concept. The present inventive concept may be embodied in different forms and should not be construed as being limited to the embodiments set forth herein.

The present inventive concept may be subjected to various modifications and may have various forms. Specific embodiments have been illustrated in the drawings and described in detail herein. However, this is not intended to limit the present disclosure to the specific embodiment or embodiments. It should be understood that the present inventive concept includes all modifications, equivalents, or replacements that fall within the spirit and technical scope thereof.

Terms such as "first and/or "second" may be used herein to describe various elements of the present disclosure, but these elements should not be construed as being limited by the terms. In other words, such terms are used only for the purpose of differentiating one element from other elements of the present disclosure. For example, without departing from the scope and spirit of the present disclosure, a first element may be referred to as a second element, and, similarly, a second element may also be referred to as a first element.

It should be understood that when an element is referred to as being "coupled" or "connected" to another element, it can be directly coupled or connected to the other element, or intervening elements may also be present. On the other hand, it should be understood that when an element is referred to as being "directly coupled" or "directly connected" to another element, no intervening elements are present. Other expressions for describing relationships between elements, for example, "between" and "immediately between" or "neighboring" and "directly neighboring", may also be interpreted likewise.

The terminology used herein is only for the purpose of describing particular embodiments and is not intended to limit the present disclosure. As used herein, the singular forms "a", "an" and "the" are intended to include the plural forms as well, unless the context clearly indicates otherwise. It should be further understood that the terms "comprises/includes" and/or "comprising/including", when used in the specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms used herein, including technical and scientific terms, have the same meanings as those commonly understood by one of ordinary in the art. It should be further understood that terms, such as those defined in commonly used dictionaries, should be interpreted as having meanings consistent with their meanings in the context of the relevant art and the present disclosure. Such terms are not to be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to the accompanying drawings. Throughout the disclosure, like reference numerals refer to like elements.

Referring to FIGS. 1-4, an electric vehicle structure according to an embodiment of the present disclosure includes a drive system 1 and a front lateral member 3 and a rear upper lateral member 5, which are elongated in a lateral direction of a vehicle and spaced apart from each other in a forward-rearward direction of the vehicle with the drive system 1 interposed therebetween. The structure further includes a rear lower lateral member 9 elongated in the lateral direction of the vehicle and disposed beneath a motor 7 of the drive system 1.

The drive system 1 includes the motor 7 and a differential 11 configured to receive power from the motor 7 and to output the power to both sides of the vehicle. The motor 7 has a rotary shaft MC disposed parallel to and spaced apart from a rotary shaft DC of the differential 11.

In other words, the drive system 1 is configured such that the power generated by the motor 7 is converted by a reducer or a transmission and is output through the differential 11. The reducer or the transmission is integrally formed in the drive system 1 in this embodiment.

For reference, when the rotary shaft MC of the motor 7 is disposed coaxially with the rotary shaft DC of the differential 11, the drive system 1 has a more compact configuration, which is advantageous in securing or conserving the interior space of the vehicle. However, the drive system 1 must have a drive shaft passing through the rotor of the motor 7 from the differential 11. Hence, the rotor of the motor 7 occupies a relatively small volume and power transmission efficiency is reduced due to oil drag caused by lubrication of the drive shaft and the rotor. This in turn leads to a decrease in fuel efficiency of the vehicle.

In this embodiment, as described above, the drive system 1 is configured such that the rotary shaft MC of the motor 7 is spaced apart from the rotary shaft DC of the differential 11 and they are connected to each other by the reducer or the transmission. Accordingly, it is possible to avoid the disadvantages of the drive system 1 in which the rotary shaft of the motor 7 is disposed coaxially with the rotary shaft of the differential 11 as described above. It is also possible to advantageously secure or conserve the interior space of the vehicle through an appropriate arrangement structure.

The rotary shaft MC of the motor 7 is disposed above and behind the rotary shaft DC of the differential 11 in the vehicle. Thus, a straight line L connecting the rotary shaft MC of the motor 7 to the rotary shaft DC of the differential 11 is inclined from upper rear side to lower front side in the vehicle. The front lateral member 3 is located above the straight line L and the rear upper lateral member 5 is located beneath the straight line L.

In other words, the rotary shaft MC of the motor 7 and the rotary shaft DC of the differential 11 are arranged in an oblique direction with respect to the vertical direction of the vehicle as illustrated in FIG. 1. The drive system 1 is thereby prevented from protruding excessively upwards and encroaching on the interior space of the vehicle. Moreover, the front lateral member 3 and the rear upper and lower lateral members 5 and 9 are disposed at the front and rear of the drive system 1, respectively. The drive system 1 may thereby be supported reliably and stably.

Figure 4:
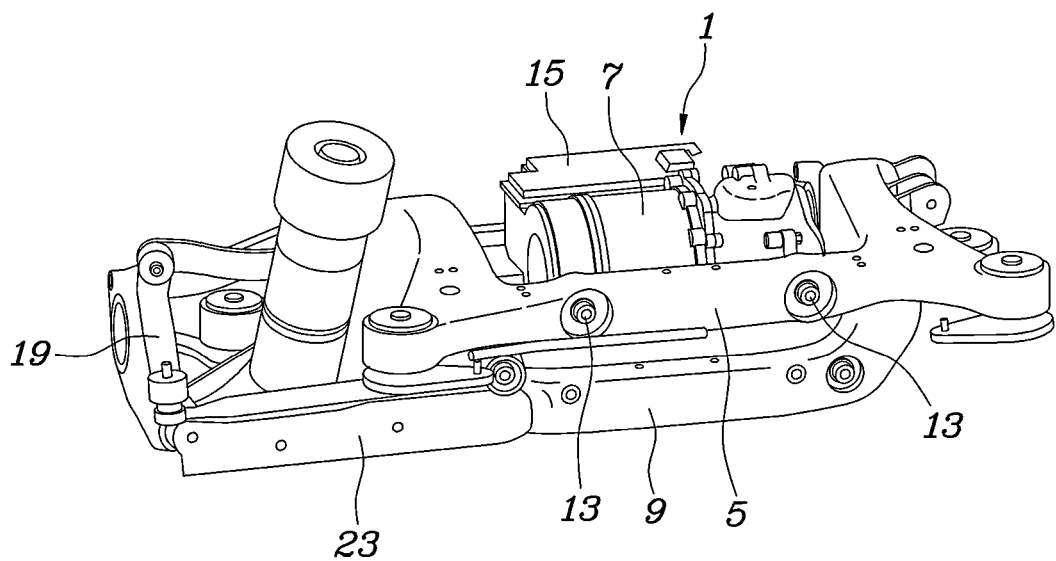
FIG. 4 is a rear view of FIG. 1.

For reference, it can be seen in FIG. 4 that a mount 13 is provided on the rear upper lateral member 5 so as to support the drive system 1.

The rear lower lateral member 9 may be installed at a height such that the areas of the rear lower lateral member 9 and the front lateral member 3 that are projected in the forward-rearward direction of the vehicle overlap each other by 70% or more.

In other words, the rear lower lateral member 9 is installed at substantially the same height as the front lateral member 3. The front and rear portions of the drive system 1 are thereby enabled to be supported at substantially the same height.

In addition, the front lateral member 3 and the rear lower lateral member are disposed beneath the rotary shaft DC of the differential 11, so as to form a triangular structure with the rotary shaft DC of the differential 11 as an upper vertex. Thus, it is possible to reliably support the drive system 1 with respect to the body of the vehicle.

On the other hand, the rear upper lateral member 5 is disposed above the rotary shaft DC of the differential 11, and the rear lower lateral member 9 is disposed in front of the rear upper lateral member 5 in the vehicle. Thus, it is possible to three-dimensionally support the drive system 1 together with the front lateral member 3 while securing the structural rigidity of the vehicle and reinforcing the strength thereof.

The drive system 1 includes an inverter 15 configured to control the motor 7. The inverter 15 is installed in front of the motor 7 and above the differential 11 to form a single unit together with the motor 7 and the differential 11.

As such, the inverter 15 is mounted by utilizing the space between the motor 7 and the differential 11, thereby making the drive system 1 compact. Therefore, the location of the inverter 15 is advantageous in securing or conserving the interior space of the vehicle.

Meanwhile, the electric vehicle structure includes a rear-wheel steering system 17 disposed between the rear upper lateral member 5 and the rear lower lateral member 9.

The rear-wheel steering system 17 may be fixed to the rear upper lateral member 5 or the rear lower lateral member 9 beneath the rotary shaft MC of the motor 7. The rear-wheel steering system 17 is configured to steer each rear wheel by allowing a tie rod 21 to rotate a rear-wheel knuckle 19 on which the rear wheel is mounted.

The rear lower lateral member 9 is connected to a lower arm 23 configured to support the rear-wheel knuckle 19.

Accordingly, it is possible to reliably secure or attain not only the rigidity of the vehicle, but also the handling performance of the vehicle by allowing the rear lower lateral member 9 to support the lateral force applied to the vehicle through the rear-wheel knuckle 19 and the lower arm 23.

As should be apparent from the above description, the present inventive concept provides an electric vehicle structure that includes the drive system installed to drive the rear wheels of the vehicle independently of the front wheels thereof to secure or conserve as much interior space in the vehicle as possible. In addition, the electric vehicle structure can be configured such that, when the rear-wheel steering system is installed in the vehicle, it is possible to prevent interference therewith and to reliably support the rear wheels to ensure that the vehicle has excellent handling performance.

Although specific embodiments of the present inventive concept have been disclosed for illustrative purposes, those of ordinary skill in the art should appreciate that various modifications, additions, and substitutions are possible, without departing from the scope and spirit of the inventive concept as disclosed in the accompanying claims.

What is claimed is:

1. An electric vehicle structure comprising:
a drive system;
a front lateral member and a rear upper lateral member, which are elongated in a lateral direction of a vehicle and spaced apart from each other in a forward-rearward direction of the vehicle with the drive system interposed therebetween; and
a rear lower lateral member elongated in the lateral direction of the vehicle and disposed beneath a motor of the drive system,
wherein the rear lower lateral member is connected to a lower arm configured to support a rear-wheel knuckle.

2. The electric vehicle structure according to claim 1, wherein:
the drive system comprises the motor and a differential configured to receive power from the motor and output the power to both sides of the vehicle; and
the motor has a rotary shaft disposed parallel to and spaced apart from a rotary shaft of the differential.

3. The electric vehicle structure according to claim 2, wherein:
the rotary shaft of the motor is disposed above and behind the rotary shaft of the differential in the vehicle so that a straight line connecting the rotary shaft of the motor to the rotary shaft of the differential is inclined from an upper rear side to a lower front side in the vehicle; and
the front lateral member is located above the straight line and the rear upper lateral member is located beneath the straight line.

4. The electric vehicle structure according to claim 3, wherein the rear lower lateral member is installed at a height such that areas of the rear lower lateral member and the front lateral member that are projected in the forward-rearward direction of the vehicle overlap each other by 70% or more.

5. The electric vehicle structure according to claim 3, wherein:
the front lateral member and the rear lower lateral member are disposed beneath the rotary shaft of the differential; and the rear upper lateral member is disposed above the rotary shaft of the differential.

6. The electric vehicle structure according to claim 3, wherein the rear lower lateral member is disposed in front of the rear upper lateral member in the vehicle.

7. The electric vehicle structure according to claim 3, wherein:
the drive system comprises an inverter configured to control the motor; and
the inverter is installed in front of the motor and above the differential to form a single unit together with the motor and the differential.

8. The electric vehicle structure according to claim 1, further comprising a rear-wheel steering system disposed between the rear upper lateral member and the rear lower lateral member.

9. The electric vehicle structure according to claim 8, wherein the rear-wheel steering system is disposed beneath a rotary shaft of the motor.

10. The electric vehicle structure according to claim 1, wherein the rear upper lateral member is provided with a mount configured to support the drive system.

11. An electric vehicle structure comprising:
a drive system comprising a motor and a differential;
a front lateral member elongated in a lateral direction of a vehicle in front of the drive system in the vehicle; and
a rear upper lateral member and a rear lower lateral member, which are elongated in the lateral direction of the vehicle behind the drive system in the vehicle,
wherein the drive system is configured such that the motor has a rotary shaft parallel to a rotary shaft of the differential and the rotary shaft of the motor is located above and behind the rotary shaft of the differential in the vehicle, and
wherein some of the front lateral member, the rear upper lateral member, and the rear lower lateral member are located above a straight line connecting the rotary shaft of the motor to the rotary shaft of the differential, and the rest of the front lateral member, the rear upper lateral member, and the rear lower lateral member are located beneath the straight line.

12. The electric vehicle structure according to claim 11, wherein:
the front lateral member is located above the straight line connecting the rotary shaft of the motor to the rotary shaft of the differential; and
the rear upper lateral member and the rear lower lateral member are disposed beneath the straight line.

13. The electric vehicle structure according to claim 11, wherein:
the rear upper lateral member and the rear lower lateral member are disposed beneath the straight line connecting the rotary shaft of the motor to the rotary shaft of the differential; and
the rear lower lateral member is disposed in front of and beneath the rear upper lateral member in the vehicle.

14. The electric vehicle structure according to claim 13, wherein the front lateral member and the rear lower lateral member are disposed in front of and beneath and behind and beneath the rotary shaft of the differential, respectively, so as to form a triangle.

15. The electric vehicle structure according to claim 13, further comprising a rear-wheel steering system disposed between the rear lower lateral member and the rear upper lateral member.

16. The electric vehicle structure according to claim 11, wherein:
the drive system comprises an inverter configured to control the motor; and
the inverter is disposed above the straight line connecting the rotary shaft of the motor to the rotary shaft of the differential.

17. The electric vehicle structure according to claim 16, wherein the inverter is installed in front of the motor and above the differential to form a single unit together with the motor and the differential.

* * * * *